US012770096B2

(12) United States Patent
Park

(10) Patent No.: US 12,770,096 B2
(45) Date of Patent: Oct. 20, 2026

(54) METHOD AND DEVICE FOR ORGANIZING LOGISTICS PICKING JOBS

(71) Applicant: COLOSSEUM CORPORATION, INC., Seoul (KR)

(72) Inventor: Jinsu Park, Seoul (KR)

(73) Assignee: COLOSSEUM CORPORATION, INC., Seoul (KR)

(*) Notice: Subject to any disclaimer, the term of this patent is extended or adjusted under 35 U.S.C. 154(b) by 298 days.

(21) Appl. No.: 18/397,992

(22) Filed: Dec. 27, 2023

(65) Prior Publication Data

US 2025/0182044 A1 Jun. 5, 2025

(30) Foreign Application Priority Data

Nov. 30, 2023 (KR) ........................ 10-2023-0171067

(51) Int. Cl.
*G06Q 10/087* (2023.01)
*G06Q 10/0631* (2023.01)

(52) U.S. Cl.
CPC ..... *G06Q 10/087* (2013.01); *G06Q 10/06311* (2013.01); *G06Q 10/06316* (2013.01)

(58) Field of Classification Search
CPC ........... G06Q 10/087; G06Q 10/06311; G06Q 10/06316; G06Q 10/08; G06Q 10/047; G06Q 10/0633; H04W 4/021; H04W 4/35
USPC ............................................................ 705/28
See application file for complete search history.

(56) References Cited

U.S. PATENT DOCUMENTS

| | | | | |
|---|---|---|---|---|
| 2021/0110334 A1* | 4/2021 | Singh | .................. | G06Q 10/087 |
| 2021/0387805 A1* | 12/2021 | Singh | .................. | B65G 1/1371 |
| 2023/0252385 A1 | 8/2023 | Maruyama et al. | | |
| 2023/0259878 A1* | 8/2023 | Jacquemart | .......... | G05D 1/0297 705/28 |
| 2024/0193542 A1* | 6/2024 | Zhu | ...................... | G06Q 10/083 |
| 2025/0061396 A1* | 2/2025 | Sikander | ................ | G06Q 10/04 |

FOREIGN PATENT DOCUMENTS

| | | | |
|---|---|---|---|
| KR | 10-2420926 B1 | 7/2022 | |
| KR | 10-2423340 B1 | 7/2022 | |
| KR | 10-2571726 B1 | 8/2023 | |
| KR | 20240050596 A * | 4/2024 | ............. G06Q 10/10 |

OTHER PUBLICATIONS

Office Action for KR 10-2023-0171067 by Korean Intellectual Property Office dated Mar. 25, 2025.

* cited by examiner

*Primary Examiner* — Russell S Glass
(74) *Attorney, Agent, or Firm* — BROADVIEW IP LAW, PC

(57) ABSTRACT

A method and device for organizing logistics picking jobs is proposed. The proposed relates to a method for organizing logistics picking jobs in response to a plurality of orders, and relates to a device for executing the method. The method includes a source initialization step of generating a plurality of picking job arrays whose elements are set as random picking jobs and a solution selection step of comparing suitabilities of the plurality of picking job arrays with each other and updating a picking job array having the highest suitability as a solution.

9 Claims, 14 Drawing Sheets

FIG. 3A

< goods order data >

| order number | goods number | order quantity |
|---|---|---|
| order-1 | goods-a | 3 |
| order-1 | goods-b | 2 |
| order-1 | goods-c | 1 |
| order-2 | goods-b | 5 |
| order-2 | goods-d | 3 |
| order-3 | goods-c | 6 |
| order-3 | goods-d | 1 |
| order-4 | goods-a | 1 |
| order-4 | goods-d | 5 |

FIG. 3B

< order quantity data >

| | | goods number | | | |
|---|---|---|---|---|---|
| | | goods-a | goods-b | goods-c | goods-d |
| order number | order-1 | 3 | 2 | 1 | 0 |
| | order-2 | 0 | 5 | 0 | 3 |
| | order-3 | 0 | 0 | 6 | 1 |
| | order-4 | 1 | 0 | 0 | 5 |

FIG. 3C

< goods location data >

| goods number | location |
|---|---|
| goods-a | loc-11 |
| goods-b | loc-13 |
| goods-c | loc-16 |
| goods-d | loc-17 |
| ...... | ...... |

FIG. 3D

< distance matrix data >

| | start-point | loc-11 | loc-13 | loc-16 | loc-17 |
|---|---|---|---|---|---|
| start-point | 0 | 5 | 4 | 3 | 2 |
| loc-11 | - | 0 | 1 | 3 | 2 |
| loc-13 | - | 1 | 0 | 1 | 5 |
| loc-16 | - | 3 | 1 | 0 | 7 |
| loc-17 | - | 2 | 5 | 7 | 0 |

FIG. 5B

< order quantity data >

| | | goods number | | | |
|---|---|---|---|---|---|
| | | goods-a | goods-b | goods-c | goods-d |
| order number | order-1 | 3 | 2 | 1 | 0 |
| | order-2 | 0 | 5 | 0 | 3 |
| | order-3 | 0 | 0 | 6 | 1 |
| | order-4 | 1 | 0 | 0 | 5 |

< goods location data >

| goods number | location |
|---|---|
| goods-a | loc-11 |
| goods-b | loc-13 |
| goods-c | loc-16 |
| goods-d | loc-17 |

| | [order-1] | [order-2] | [order-3] | [order-4] |
|---|---|---|---|---|
| picking job array | job-A | job-B | job-C | job-D |

| picking job | location list |
|---|---|
| job-A | loc-11, loc-13, loc-16 |
| job-B | loc-13, loc-17 |
| job-C | loc-16, loc-17 |
| job-D | loc-11, loc-17 |

< location list data >

FIG. 5C

< location list data >

| picking job | location list |
|---|---|
| job-A | loc-11, loc-13, loc-16 |
| job-B | loc-13, loc-17 |
| job-C | loc-16, loc-17 |
| job-D | loc-11, loc-17 |

< location ranking data >

| location | priority value | ranking |
|---|---|---|
| loc-11 | 1001 | 4 |
| loc-13 | 2001 | 3 |
| loc-16 | 3001 | 2 |
| loc-17 | 4001 | 1 |

| picking job | picking sequence |
|---|---|
| job-A | start-point → loc-16 → loc-13 → loc-11 |
| job-B | start-point → loc-17, loc-13 |
| job-C | start-point → loc-17, loc-16 |
| job-D | start-point → loc-17, loc-11 |

< picking sequence data >

FIG. 5D

< picking sequence data >

| picking job | picking sequence |
|---|---|
| job-A | start-point → loc-16 → loc-13 → loc-11 |
| job-B | start-point → loc-17, loc-13 |
| job-C | start-point → loc-17, loc-16 |
| job-D | start-point → loc-17, loc-11 |

< distance matrix data >

| | start-point | loc-11 | loc-13 | loc-16 | loc-17 |
|---|---|---|---|---|---|
| start-point | 0 | 5 | 4 | 3 | 2 |
| loc-11 | - | 0 | 1 | 3 | 2 |
| loc-13 | - | 1 | 0 | 1 | 5 |
| loc-16 | - | 3 | 1 | 0 | 7 |
| loc-17 | - | 2 | 5 | 7 | 0 |

< travel distance for each picking job >

| picking job | travel distance |
|---|---|
| job-A | 3+1+1 = 5 |
| job-B | 2+5 = 7 |
| job-C | 2+7 = 9 |
| job-D | 2+2 = 4 |

METHOD AND DEVICE FOR ORGANIZING LOGISTICS PICKING JOBS

CROSS REFERENCE TO RELATED APPLICATION

The present application claims priority to Korean Patent Application No. 10-2023-0171067, filed Nov. 30, 2023, the entire contents of which are incorporated herein for all purposes by this reference.

BACKGROUND OF THE INVENTION

Field of the Invention

The present disclosure relates to a method for organizing logistics picking jobs in response to a plurality of orders, and relates to a device for executing the method.

More particularly, the present disclosure relates to a method for assigning picking jobs in response to a plurality of orders so as to minimize the sum of travel distances of all the picking jobs when picking goods from a logistics warehouse in order to transport the goods included in the orders, and relates to a device for executing the method.

Description of the Related Art

Since the end of the 20th century, as personal computers have become widely available and high-speed communication networks have been established, various Internet services using those technologies have developed. In particular, the amount of goods orders and deliveries via online commerce is increasing every year and the number of cases of purchasing goods or providing services non-face-to-face is gradually increasing due to the coronavirus-19 infection that spread in year 2020. Accordingly, not only B2C logistics volume but also B2B logistics volume are currently increasing every year.

In order to facilitate transportation at logistics terminals or logistics warehouses, goods are found and quantities thereof are checked through picking jobs. Organizations which operate the logistics terminals or logistics warehouses operate warehouse management systems to check where the goods are located. However, with a warehouse management system alone, planning a picking job sequence for minimizing distances traveled in a warehouse is, in fact, difficult.

Meanwhile, Korean Patent No. 10-2420926 disclosed a "METHOD FOR OPTIMIZING ORDER PICKING" for collecting and shipping customer-ordered goods for each order from stock in a warehouse storing the goods.

In the above disclosed embodiment, the method includes: pre-inputting distance information including information about departure points, arrival points, and inter-point distances in a warehouse into a database; inputting order information about orders and parameter information about parameters for the orders into a database; performing order picking optimization on the basis of the input order information, parameter information, and distance information; and storing the optimized order picking results into a database, and the performing of the order picking optimization performs the optimization so as to minimize the number of locations for which a cart has to visit and travel distances of the cart.

However, in the above disclosed embodiment, since the optimization is performed by determining the number of locations through which the cart passes and the number of cases in which the travel distances are minimum, it may take a considerable time to calculate the number of cases.

DOCUMENTS OF RELATED ART

Patent Document

Korean Patent No. 10-2420926

SUMMARY OF THE INVENTION

An objective of the present disclosure is to provide a method for assigning picking jobs in response to a plurality of orders so as to minimize the sum of travel distances of all the picking jobs when picking goods from a logistics warehouse in order to transport the goods included in the orders, and is to provide a device for executing the method.

According to an exemplary embodiment of the present disclosure in order to achieve the objective as described above, there is provided a method for organizing logistics picking jobs, the method including: a source initialization step of generating a plurality of picking job arrays whose elements are set as random picking jobs; and a solution selection step of comparing suitabilities of the plurality of picking job arrays with each other and updating a picking job array having the highest suitability as a solution.

In the exemplary embodiment, indices of the respective picking job arrays may correspond to orders, and the elements may correspond to the picking jobs for handling the orders.

In the exemplary embodiment, the number of orders handled by each of a plurality of picking jobs may be same as each other, or the number of orders handled by each picking job except for one picking job may be same as each other.

In the exemplary embodiment, each suitability may be a sum of distances traveled between locations in order to pick goods included in the orders.

In the exemplary embodiment, location information about the goods to be picked for each picking job may be obtained by referencing goods location data, a sequence of visiting the locations of the goods may be determined by referencing location ranking data, and the distances traveled when the locations of the goods may be visited in the determined sequence is calculated by referencing distance matrix data.

In the exemplary embodiment, the solution selection step may include: assigning a first array which is a picking job array to an employee module; searching for, by the employee module, a second array adjacent to the first array; calculating, by the employee module, suitability of the second array and transmitting one array having higher suitability from among the first array and second array to an onlooker module; probabilistically selecting one of a plurality of arrays received by the onlooker module; searching for a fourth array adjacent to a third array probabilistically selected by the onlooker module; calculating, by the onlooker module, suitability of the fourth array and selecting one array having higher suitability from among the third array and fourth array; and updating the solution as the selected array when the suitability of the array selected by the onlooker module is higher than the suitability of the solution.

In the exemplary embodiment, the searching for the second array adjacent to the first array or the searching for of the fourth array adjacent to the second array may include: a first step of randomly setting an exchange ratio; a second step of searching for a second order whose goods list is same as or similar to that of a first order corresponding to an index selected in the first array or second array; and a third step of exchanging a picking job of the first order and a picking job of the second order, and the second step and third step may be re-executed when the number of elements exchanged in the first array or second array is less than a value of (a total number of orders×the exchange ratio).

In the exemplary embodiment, the probabilistically selecting of one of the plurality of arrays received by the onlooker module may execute any one of a roulette wheel selection method performs a Monte Carlo method, a ranking-based selection method, a stochastic universal sampling method, and a tournament selection method.

In the exemplary embodiment, the solution selection step may increase the number of update attempts by one when the suitability of the array selected by the onlooker module is not higher than the suitability of the solution.

In the exemplary embodiment, the method may further include a source re-search step of generating the plurality of picking job arrays whose elements are set as the random picking jobs when the number of update attempts exceeds a maximum number of update attempts.

In the exemplary embodiment, the source re-search step may transmit an instruction for the onlooker module to cause a scout module to generate the plurality of picking job arrays whose elements are set as the random picking jobs when the number of update attempts exceeds the maximum number of update attempts.

In the exemplary embodiment, when the number of executions of the solution selection step exceeds a maximum number of executions of the solution selection step, the solution may be output, and when not, the solution selection step may be executed again.

According to another exemplary embodiment of the present disclosure, there is provided a device for organizing logistics picking jobs, the device including: an employee module configured to search for a second array adjacent to a first array which is an assigned picking job ray and transmit one array having higher suitability from among the first array and the second array to an on-looker module; and the onlooker module configured to probabilistically select one of a plurality of arrays received, search for a fourth array adjacent to a probabilistically selected third array, select one array having higher suitability from among the third array and the fourth array, and update a solution to the selected array when the suitability of the selected array is higher than the suitability of the solution.

In another exemplary embodiment, the device may further include a scout module configured to generate a plurality of picking job arrays whose elements are set as random picking jobs in response to an instruction from the onlooker module when the number of update attempts exceeds the maximum number of update attempts.

In the present disclosure, distances traveled between locations is minimized when goods are picked from a logistics warehouse, whereby speed of logistics jobs may be improved and the amount of picking jobs done may be increased. In addition, a picking job array having higher suitability is selected by comparison with suitability of an adjacent picking job array, whereby organizing logistics picking jobs may be performed quickly because the number of all cases is not required to be calculated.

BRIEF DESCRIPTION OF THE DRAWINGS

FIG. 3A is a view illustrating an example of goods order data in the exemplary embodiment of the present disclosure. FIG. 3B is a view illustrating an example of order quantity data in the exemplary embodiment of the present disclosure. FIG. 3C is a view illustrating an example of goods location data in the exemplary embodiment of the present disclosure. FIG. 3D is a view illustrating an example of distance matrix data in the exemplary embodiment of the present disclosure.

FIG. 5B is a view briefly illustrating an example of a process of generating location list data in the exemplary embodiment of the present disclosure. FIG. 5C is a view briefly illustrating an example of a process of determining a picking sequence of goods in the exemplary embodiment of the present disclosure. FIG. 5D is a view briefly illustrating an example of a process of calculating a travel distance of each picking job in the exemplary embodiment of the present disclosure.

DETAILED DESCRIPTION OF THE INVENTION

Figure 1:
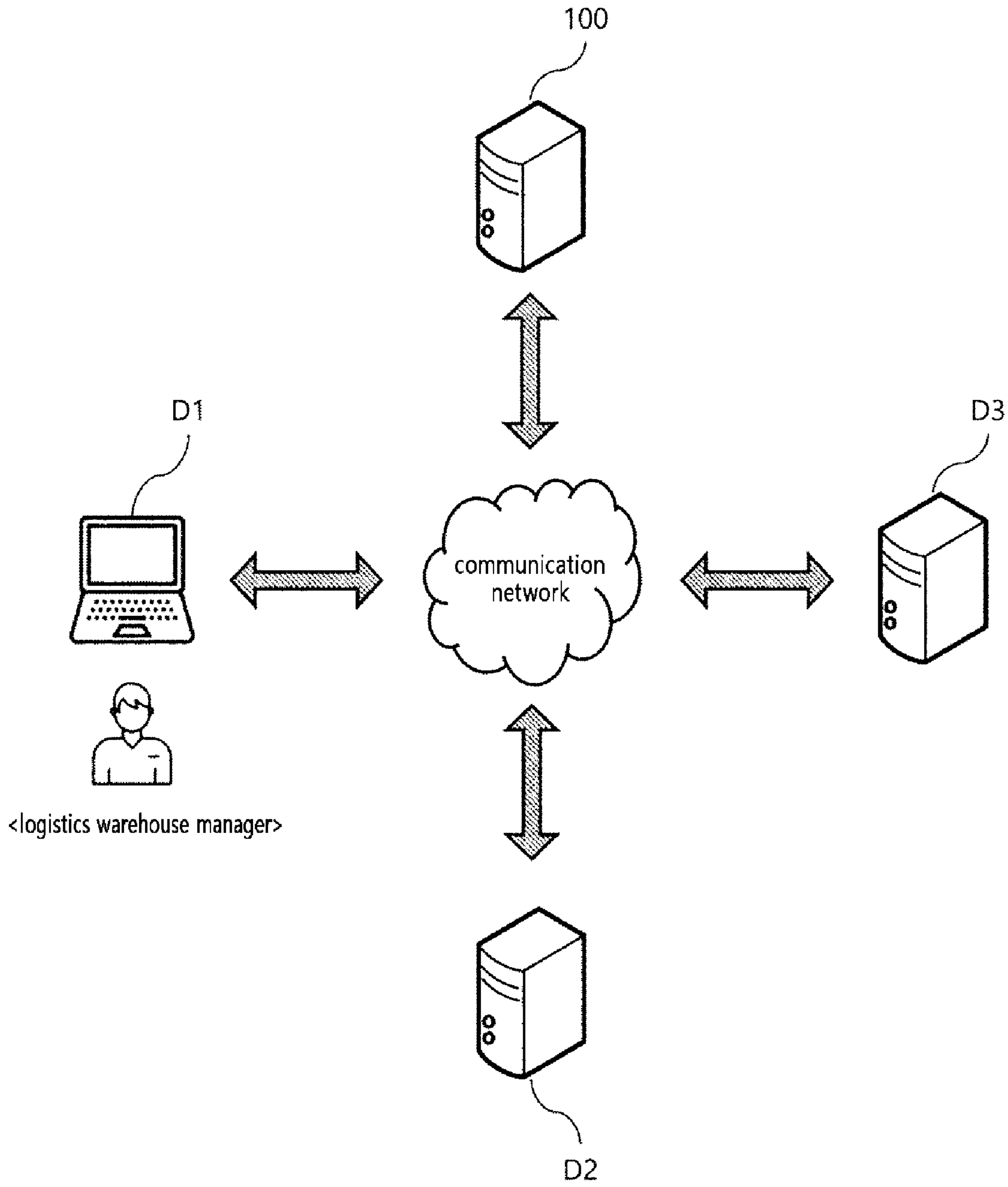
FIG. 1 is a view briefly illustrating a device for organizing logistics picking jobs and other components thereof according to an exemplary embodiment of the present disclosure.

Hereinafter, exemplary embodiments of the present disclosure are described with reference to the accompanying drawings. Advantages and features of the present disclosure and the methods of achieving the same will become apparent with reference to the exemplary embodiments described below in detail in conjunction with the accompanying drawings. However, the technical ideas of the present disclosure are not limited to the exemplary embodiments disclosed below, but will be implemented in a variety of different forms. These exemplary embodiments are provided only to complete the technical ideas of the present disclosure and to completely inform the scope of the present disclosure to those skilled in the art to which the present disclosure pertains, and the technical ideas of present disclosure are only defined by the scope of the claims.

In adding reference numerals to the components of each drawing, it should be noted that the same reference numerals are used to refer to the same components as much as possible even if displayed on different drawings. In the following description of the present disclosure, detailed descriptions of related known functions and components incorporated herein will be omitted when it is determined that the subject matter of the present disclosure may be obscured thereby.

Unless otherwise defined, all terms (including technical and scientific terms) used in the present description may be used in a sense that can be commonly understood by those skilled in the art. In addition, terms defined in the commonly used dictionary are not ideally or excessively interpreted unless specifically defined. The terminology used herein is for the purpose of describing particular embodiments only and is not intended to be limiting of the embodiments of the present disclosure. In the present specification, the singular form also includes the plural form unless otherwise specified in the phrase.

Furthermore, when describing the components of the present disclosure, terms such as first, second, A, B, (a), and (b) may be used. Since these terms are provided merely for the purpose of distinguishing the components from each other, they do not limit the nature, sequence, order, or the like of the corresponding components. When a component is described as being "connected", "coupled", or "linked" to another component, that component may be directly connected or linked to that other component. However, it should be understood that yet another component between each of the components may be "connected", "coupled", or "linked" to each other.

In the exemplary embodiments of the present disclosure, "a logistics warehouse manager" may be an individual or agency that obtains information about logistics picking jobs (hereinafter referred to as "picking jobs") organized by a device of the present disclosure in response to orders, and then performs the picking jobs or instructs other workers to perform the picking jobs according to the obtained information about the picking jobs.

A "warehouse management system" may be a set of hardware and software that manage warehousing, stacking, picking, packaging, shipping, and inventory tracking of goods in a logistics warehouse. The logistics warehouse manager may manage the goods warehoused in the logistics warehouse by using a warehouse management system.

A "third party system" may be a set of hardware and software for transmitting order information to a logistics warehouse in order to order goods.

FIG. 1 is a view briefly illustrating a device for organizing logistics picking jobs and other components according to the exemplary embodiment of the present disclosure.

The device 100 (hereinafter referred to as "the device of the present disclosure") for organizing the logistics picking jobs according to the exemplary embodiment of the present disclosure may be a single computing device or a set of a plurality of computing devices connected to each other through a communication network.

The device 100 of the present disclosure, a terminal device D1 used by a warehouse manager, a warehouse management system D2, and a third party system D3 are connected to a communication network, thereby allowing data to be transmitted or received therebetween. The terminal device D1 is a computing device including a processor, a memory device, and an input/output device, and may be, for example, one of a desktop computer, a laptop computer, a smartphone, and a tablet computer. Each of the warehouse management system D2 and third party system D3 may be a set of a plurality of server computers connected to each other through a communication network.

The logistics warehouse manager may transmit goods location data and distance matrix data, and goods order data received from the third party system D2 to the device 100 of the present disclosure by using the terminal device D1. Alternatively, according to an instruction of the warehouse manager, the warehouse management system D2 may directly transmit the goods location data and distance matrix data to the device 100 of the present disclosure. Alternatively, the third party system D3 may directly transmit the goods order data to the device 100 of the present disclosure.

Goods order data may represent information about goods included in orders and order quantities of the goods. Goods location data may represent information about locations where the goods are located in a warehouse. Distance matrix data may represent information about travel distances between the locations in the warehouse as a matrix.

Figure 2:
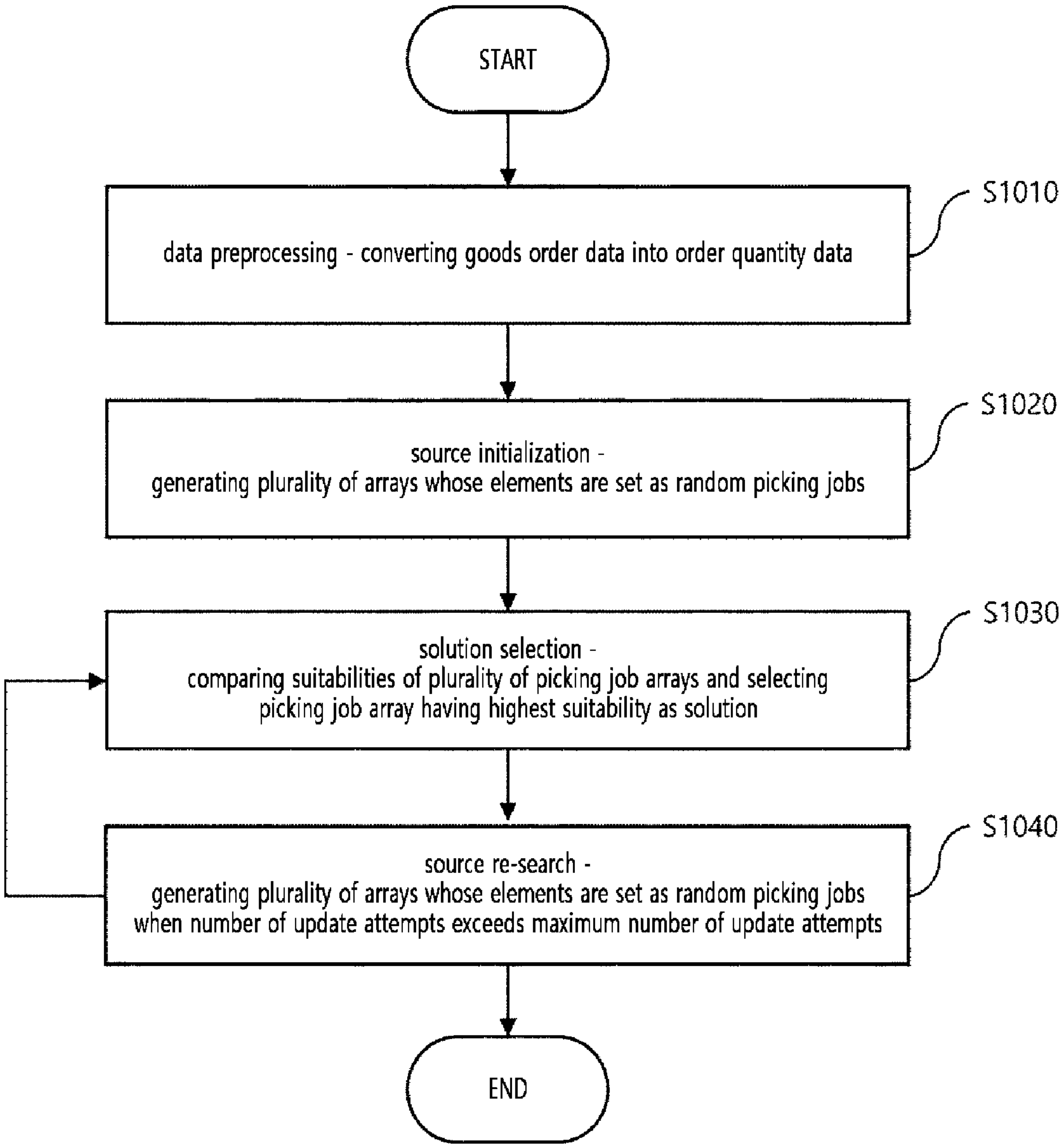
FIG. 2 is a flowchart briefly illustrating a method for organizing logistics picking jobs according to an exemplary embodiment of the present disclosure.

FIG. 2 is a flowchart briefly illustrating a method for organizing logistics picking jobs according to an exemplary embodiment of the present disclosure.

The method for organizing the logistics picking jobs according to the exemplary embodiment of the present disclosure (hereinafter referred to as "the method for the present disclosure") may include each of a data preprocessing step S1010, a source initialization step S1020, a solution selection step S1030, and a source re-search step S1040.

In the data preprocessing step S1010, the device 100 of the present disclosure may receive goods order data, goods location data, and distance matrix data from a terminal device D1 of a warehouse manager, a warehouse management system D2, and a third party system D3. In addition, the device 100 of the present disclosure may perform preprocessing to convert the goods order data into order quantity data created in a matrix form.

FIG. 3A is a view illustrating an example of goods order data in the exemplary embodiment of the present disclosure. FIG. 3B is a view illustrating an example of order quantity data in the exemplary embodiment of the present disclosure.

The goods order data may represent information about goods included in orders and order quantities of the goods. The goods order data may include an order number, a goods number, and order quantities for the goods. Each of the order number and goods number may be composed of a combination of numbers and letters so as to distinguish them from other order numbers or other goods numbers.

The order quantity data may represent, in a matrix form, information about order quantities of goods included in orders. In the order quantity data, a row may represent each order, and a column may represent each of goods. In addition, an element of a matrix may represent order quantities of the goods.

The device 100 of the present disclosure may parse goods order data, obtain order quantity information for each of goods for each order, and record the obtained order quantity information for each of goods in elements of a matrix, thereby generating order quantity data.

FIG. 3C is a view illustrating an example of goods location data in the exemplary embodiment of the present disclosure.

The goods location data may represent location information of a logistics warehouse where goods are located. The goods location data may include goods numbers and location numbers. A location number may be a combination of numbers and letters so as to distinguish it from other location numbers.

FIG. 3D is a view illustrating an example of distance matrix data in the exemplary embodiment of the present disclosure.

The distance matrix data may represent information about travel distances between locations in a warehouse in a matrix form. In the distance matrix data, a row may represent each departure location and a column may represent each arrival location. In addition, an element of a matrix may represent a distance of travelling from a location corresponding to a row to a location corresponding to a column.

In the source initialization step S1020, the device 100 of the present disclosure may set an element of a picking job array as a random picking job. That is, the device 100 of the present disclosure may generate a plurality of picking job arrays in which elements are set as random picking jobs.

Each picking job array is a list of picking jobs that handle orders. Indices of each array may correspond to orders, and elements of each array may correspond to the picking jobs that handle the orders.

For example, in an array of picking jobs such as "[job-A, job-B, job-C, job-D]", a first element may represent that picking job A job-A handles order number 1, a second element may represent that picking job B job-B handles order number 2, a third element may represent that picking job C job-C handles order number 3, and a fourth element may represent that picking job D job-D handles order number 4.

As an order handled by each picking job is randomly set, the amount of work done or travel distances of each picking job may vary.

The number of picking job arrays may indicate the number of orders. In addition, in the exemplary embodiment of the present disclosure, a picking job array refers to a source or a solution, and may obtain finally optimized picking job D information by repeating a process of starting from the source which is an initialized picking job array and selecting a picking job array having higher suitability as the solution.

Figure 4A:
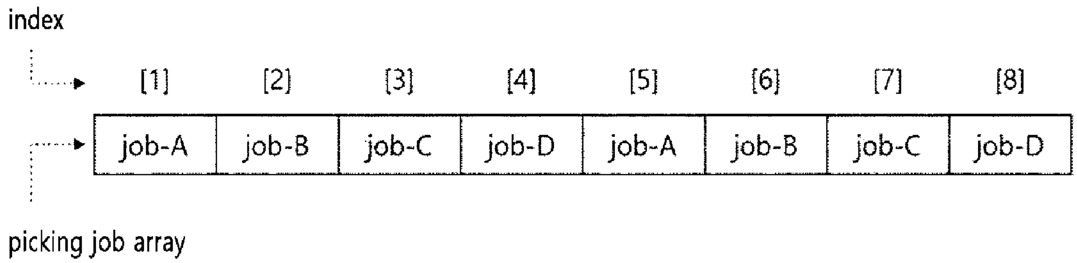
FIGS. 4A and 4B are views briefly illustrating an example of a process of initializing a picking job array in the exemplary embodiment of the present disclosure.
Figure 4B:
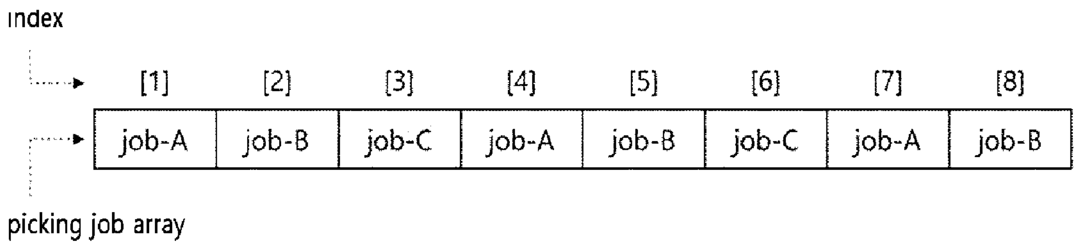

FIGS. 4A and 4B are views briefly illustrating an example of a process of initializing a picking job array in the exemplary embodiment of the present disclosure.

When the device 100 of the present disclosure initializes a picking job array, each of picking jobs having the same number of orders with respect to an entire order may be assigned. Alternatively, the number of orders handled by each picking job except for one picking job may be the same with each other.

For example, as shown in FIG. 4A, in a case when four picking jobs are assigned to eight orders, picking job A job-A may be assigned to orders 1 and 5, picking job B job-B may be assigned to orders 2 and 6, picking job C job-C may be assigned to orders 3 and 7, and picking job D job-D may be assigned to orders 4 and 8. In the example, all the picking jobs may handle the same number of orders (i.e., two).

Alternatively, as shown in FIG. 4B, when three picking jobs are assigned to eight orders, picking job A job-A may be assigned to orders 1, 4, and 7, picking job B job-B may be assigned to orders 2, 5, and 8, and picking job C job-C may be assigned to orders 3 and 6. In the example, picking jobs A and jobs B job-A and job-B may handle the same number of orders (i.e., three), while picking job C job-C may handle a different number of orders (i.e., two).

The device 100 of the present disclosure may calculate suitability for each picking job array after generating a plurality of picking job arrays whose elements are set as random picking jobs. For example, suitability may be a total distance of travelling between locations in order to pick goods included in orders.

Figure 5A:
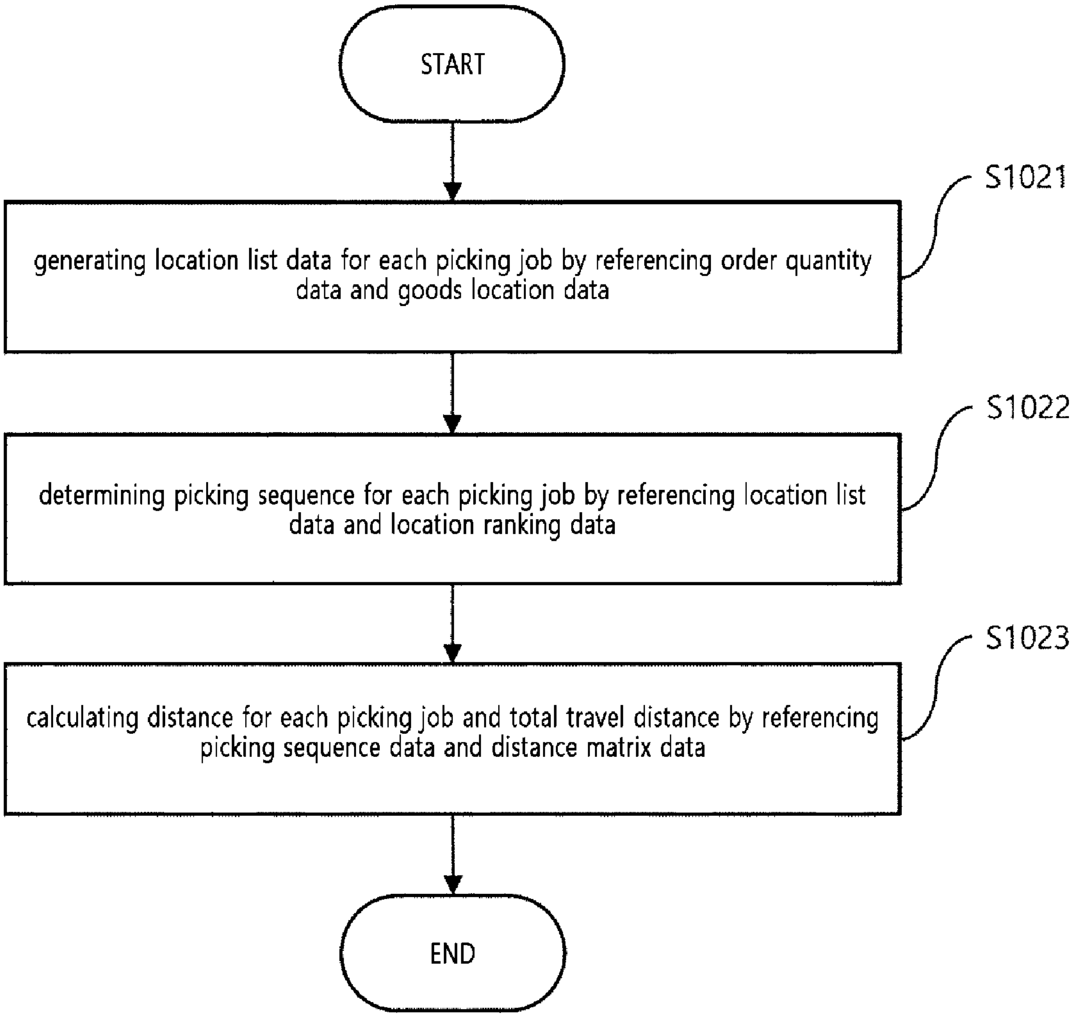
FIG. 5A is a flowchart briefly illustrating a method for calculating suitability in the exemplary embodiment of the present disclosure.

FIG. 5A is a flowchart briefly illustrating a method for calculating suitability in the exemplary embodiment of the present disclosure.

In the method for calculating the suitability, first, in step S1021, a device 100 of the present disclosure may generate location list data for each picking job.

FIG. 5B is a view briefly illustrating an example of a process of generating location list data in the exemplary embodiment of the present disclosure.

The device 100 of the present disclosure may obtain location information about goods to be picked for each picking job by referencing order quantity data and goods location data, and then generate location list data In the source initialization step S1020, the picking job array in the example is initialized such that order number 1 order-1 is handled by picking job A job-A, order number 2 order-2 is handled by picking job B job-B, order number 3 order-3 is handled by picking job C job-C, and order number 4 order-4 is handled by picking job D job-D.

By referencing the order quantity data, the device 100 of the present disclosure may confirm that picking job A job-A that handles order number 1 picks goods a, goods b, and goods c goods-a, goods-b, and goods-c. In addition, by referencing the goods location data, the device 100 of the present disclosure may confirm that goods a goods-a is located at location 11 loc-11, goods b goods-b is located at location 13 loc-13, and goods c goods-c is located at location 16 loc-16. The device 100 of the present disclosure may store, in the location list data, location 11, location 13, and location 16 loc-11, loc-13, and loc-16, which are locations to be visited when picking job A job-A is executed, as locations that correspond to picking job A job-A.

By referencing the order quantity data, the device 100 of the present disclosure may confirm that picking job B job-B that handles order number 2 picks goods b and goods d goods-b and goods-d. In addition, by referencing the goods location data, the device 100 of the present disclosure may confirm that goods b goods-b is located at location 13 loc-13 and goods d goods-d is located at location 17 loc-17. The device 100 of the present disclosure may store, in the location list data, location 13 and location 17 loc-13 and loc-17, which are locations to be visited when picking job B job-B is executed, as locations that correspond to picking job B job-B.

By referencing the order quantity data, the device 100 of the present disclosure may confirm that picking job C job-C that handles order number 3 picks goods c and goods d goods-c and goods-d. In addition, by referencing the goods location data, the device 100 of the present disclosure may confirm that goods c goods-c is located at location 16 loc-16 and goods d goods-d is located at location 17 loc-17. The device 100 of the present disclosure may store, in the location list data, location 16 and location 17 loc-16 and loc-17, which are locations to be visited when picking job C job-C is executed, as locations that correspond to picking job C job-C.

By referencing the order quantity data, the device 100 of the present disclosure may confirm that picking job D job-D that handles order number 4 picks goods a and goods d goods-a and goods-d. In addition, by referencing the goods location data, the device 100 of the present disclosure may confirm that goods a goods-a is located at location 11 loc-11 and goods d goods-d is located at location 17 loc-17. The device 100 of the present disclosure may store, in the location list data, location 11 and location 17 loc-11 and loc-17, which are locations to be visited when picking job D job-D is executed, as locations that correspond to picking job D job-D.

Then, in Step S1022, the device 100 of the present disclosure may determine a picking sequence of goods for each picking job.

FIG. 5C is a view briefly illustrating an example of a process of determining a picking sequence of goods in the exemplary embodiment of the present disclosure.

By referencing the location list data and location ranking data, the device 100 of the present disclosure may determine a picking sequence of goods (i.e., a particular sequence of visiting locations of goods) for each picking job. For example, the device 100 of the present disclosure may determine a picking sequence of goods so that locations are visited in order of highest priority in a picking job. In addition, the device 100 of the present disclosure may generate a determined picking sequence as picking sequence data.

As shown in the example, the location ranking data may be data that defines rankings of locations that should be visited first for picking. The location ranking data may include a location number, a priority value, and a ranking of each location. A location ranking may be determined by using the priority value. For example, as shown in the example, the larger the priority value, the higher the location ranking may be determined, or the smaller the priority value, the higher the location ranking may be determined. In addition, As shown in the example, it may be defined such that the smaller a number, the higher a location ranking is, or such that the higher a number, the higher a location ranking is.

In picking job A job-A, the device 100 of the present disclosure may sort locations in order of highest ranking among locations to be visited to pick goods a, goods b, and goods c goods-a, goods-b, and goods-c. A ranking of location 11 loc-11 where goods a goods-a is located is 4, a ranking of location 13 loc-13 where goods b goods-b is located is 3, and a ranking of location 16 loc-16 where goods c goods-c is located is 2, so the device 100 of the present disclosure may determine a picking sequence of picking job A job-A in order of locations 16, 13, and 11 starting from a starting point.

In addition, a ranking of location 13 loc-13 where goods b goods-b is located is 3, and a ranking of location 17 loc-17 where goods d goods-d is located is 1, so the device 100 of the present disclosure may determine a picking sequence of picking job B job-B in order of locations 17 and 13 starting from the starting point.

In addition, in picking job C job-C, a ranking of location 16 loc-16 where goods c goods-c is located is 2, and a ranking of location 17 loc-17 where goods d goods-d is located is 1, so the device 100 of the present disclosure may determine a picking sequence of picking job C job-C in order of locations 17 and 16 starting from the starting point.

In addition, in picking job D job-D, a ranking of location 11 loc-11 where goods a goods-a is located is 4, and a ranking of location 17 loc-17 where goods d goods-d is located is 1, so the device 100 of the present disclosure may determine a picking sequence of picking job D job-D in order of locations 17 and 11 starting from the starting point.

Then, in step S1023, the present disclosure device 100 may calculate a travel distance for each picking job and calculate a total travel distance.

FIG. 5D is a view briefly illustrating an example of a process of calculating a travel distance of each picking job in the exemplary embodiment of the present disclosure.

By referencing the picking sequence data and distance matrix data, the device 100 of the present disclosure may obtain distance information when travelling between locations in picking jobs and aggregate the obtained distance information, thereby calculating a travel distance for each picking job. In addition, the device 100 of the present disclosure may calculate a total travel distance by adding up the travel distances for picking jobs and determine the total travel distance as suitability.

As shown in the example, picking job A job-A visits locations 16, 13, and 11 in sequence starting from the starting point, so the device 100 of the present disclosure may calculate 5 as a travel distance of picking job A job-A by adding up all of 3 which is a distance between location 16 and the starting point shown in the distance matrix data, 1 which is a distance between locations 16 and 13, and 1 which is a distance between locations 13 and 11.

In addition, picking job B job-B visits locations 17 and 13 in sequence starting from the starting point, so the device 100 of the present disclosure may calculate 7 as a travel distance of picking job B job-B by adding up all of 2 which is a distance between location 17 and the starting point shown in the distance matrix data and 5 which is a distance between locations 17 and 13.

In addition, picking job C job-C visits locations 17 and 16 in sequence starting from the starting point, so the device 100 of the present disclosure may calculate 9 as a travel distance of picking job C job-C by adding up all of 2 which is a distance between location 17 and the starting point shown in the distance matrix data and 7 which is a distance between locations 17 and 16.

In addition, picking job D job-D visits locations 17 and 11 in sequence starting from the starting point, so the device 100 of the present disclosure may calculate 4 as a travel distance of picking job D job-D by adding up all of 2 which is a distance between location 17 and the starting point shown in the distance matrix data, and 2 which is a distance between locations 17 and 11.

The device of the present disclosure may calculate 25, which is the sum of the travel distances of picking job A to picking job D job-A to job-D, as the total travel distance, and determine the total travel distance as suitability. In the exemplary embodiment of the present disclosure, it may be defined that the shorter the total travel distance, the higher the suitability, and the longer the total travel distance, the lower the suitability. Accordingly, the suitability of a picking job array may be a value inversely proportional to the total travel distance.

In the solution selection step S1030, the device 100 of the present disclosure may compare the suitabilities of the plurality of picking job arrays with each other and select a picking job array having the highest suitability as a solution.

The device 100 of the present disclosure may include employee modules, an onlooker module, and a scout module in order to execute an operation of selecting a solution from picking job arrays. Each module may be a computing device, or may be software which is stored on the computing device and executed as a process on the computing device.

Figure 6A:
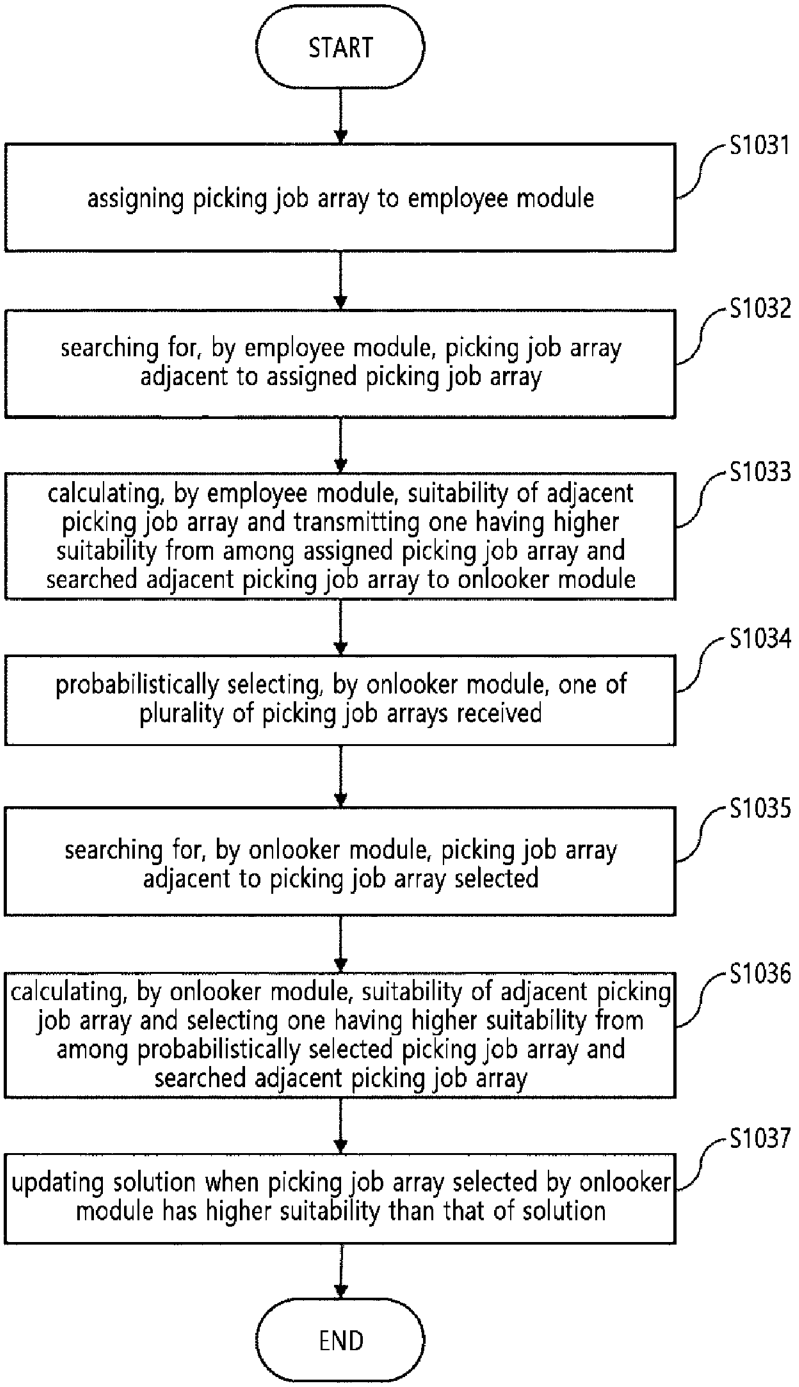
FIG. 6A is a flowchart briefly illustrating a method for selecting a solution in the exemplary embodiment of the present disclosure.

FIG. 6A is a flowchart briefly illustrating a method for selecting a solution in the exemplary embodiment of the present disclosure.

In the method for selecting the solution, first, in step S1031, the device 100 of the present disclosure may assign a picking job array generated in the source initialization step S1020 to each employee module. In step S1031, a plurality of employee modules may be assigned respective picking job arrays different from each other.

Next, in step S1032, each employee module may search for a picking job array adjacent to the assigned picking job array.

The adjacent picking job array may be another picking job array of which one element is exchanged for another element. In addition, in the exemplary embodiment of the present disclosure, an adjacent picking job array is an adjacent source, and a process of comparing suitability of the adjacent source with that of the picking job array which is the source, and selecting the one having higher suitability as a solution may be repeated, thereby obtaining finally optimized picking job information.

Figure 6B:
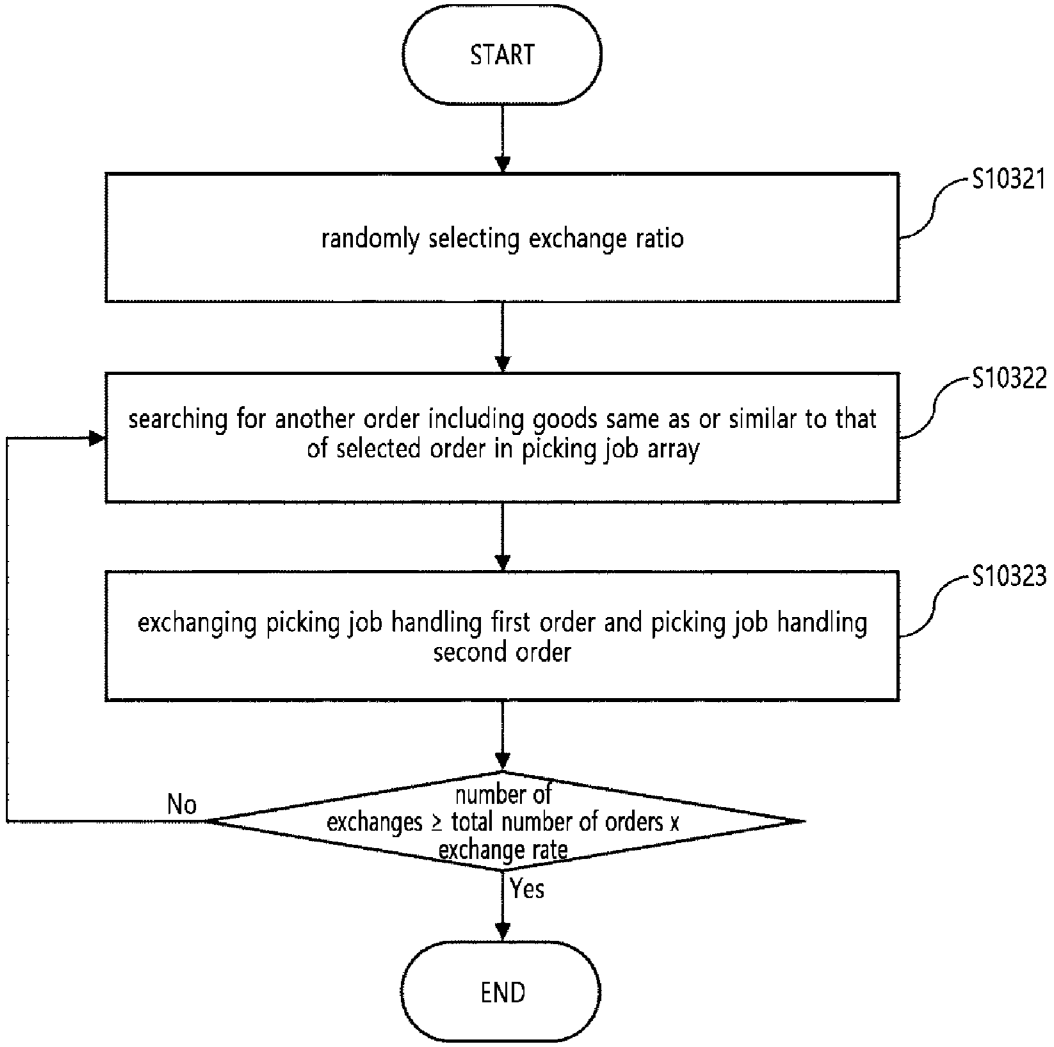
FIG. 6B is a flowchart briefly illustrating a method for searching for an adjacent picking job array in the exemplary embodiment of the present disclosure.

FIG. 6B is a flowchart briefly illustrating a method for searching for an adjacent picking job array in the exemplary embodiment of the present disclosure.

In the method for searching for the adjacent picking job array, first, in step S10321, an employee module may randomly select an exchange ratio (β, 0<β≤; 1 or 100%).

The exchange ratio may represent a ratio of the number of orders for which picking jobs are to be exchanged with each other to the total number of orders which is the number of elements in a picking job array. For example, when two orders are exchanged with each other out of a total of four orders, an exchange ratio β may be 0.5 or 50%. As the exchange rate increases, the number of elements exchanged with each other in the picking job array may increase.

Next, in step S10322, the employee module may search for another order including goods the same as or similar to those of the selected order in the picking job array (or another order having the same or similar goods list).

The employee module may randomly select one order (i.e., a first order, corresponding to an index of the picking job array) from the picking job array, and then search for another order (i.e., a second order) including the same or similar goods by referencing order quantity data. In this case, the picking job that handles the second order may be different from the picking job that handles the first order.

Then, in step S10323, in the picking job array, the employee module may exchange (or may switch between) a picking job at a position corresponding to the first order and a picking job at a position corresponding to the second order. Accordingly, the number of picking jobs assigned to the picking job array does not change.

In order to exchange picking jobs with each other in proportion to an exchange ratio, the employee module may perform repeatedly each of step S10322 of searching for another second order that is the same as or similar to the selected first order and step S10323 of exchanging picking jobs corresponding to the first and second orders with each other. When the number of elements exchanged in the picking job array is greater than or equal to a value of (the total number of orders×the exchange ratio), the employee module may terminate the method for searching for the adjacent picking job array and determine the picking job array having exchanged elements as an adjacent picking job array.

In the method for selecting the solution again, in step S1033, the employee module may calculate suitability of the searched adjacent picking job array and transmit the one having higher suitability from among the assigned picking job array and the searched adjacent picking job array to the onlooker module.

The method for calculating the suitability of the adjacent picking job array may be the same as the method for calculating the suitability of the picking job array in the source initialization step shown in FIG. 5A.

Each of the plurality of employee modules searches for an adjacent picking job array of an assigned picking job array, calculates suitability of the adjacent picking job array, and then transmits the picking job array having higher suitability from among the assigned picking job array and the searched adjacent picking job array to the onlooker module.

Next, in step S1034, the onlooker module may probabilistically select one of a plurality of picking job arrays received.

The onlooker module may probabilistically select one of the plurality of picking job arrays by using a roulette wheel selection method. The roulette wheel selection method may determine a probability of being selected in proportion to the suitability of each of the plurality of picking job arrays. Alternatively, the onlooker module may probabilistically select one of the plurality of picking job arrays by using a Monte Carlo method, a ranking based selection method, a stochastic universal sampling method, or a tournament selection method.

Next, in step S1035, the onlooker module may search for an adjacent picking job array of the selected picking job array.

The method for searching for the adjacent picking job array may be the same as the method used by the employee module to search for an adjacent picking job array shown in FIG. 6B.

Then, in step S1036, the onlooker module may calculate suitability of the searched adjacent picking job array and select the one having higher suitability from among the probabilistically selected picking job array and the searched adjacent picking job array.

Lastly, in step S1037, in a case where the picking job array selected in the previous step (i.e., step S1036) has higher suitability than that of the solution, the onlooker module may update the picking job array selected in the previous step (i.e., step S1036) as a solution.

When executing this step initially, the onlooker module may select the selected picking job array as a solution. When executing this step repeatedly, the onlooker module may compare the suitability of the picking job array (i.e., a first array) selected in the previous step (i.e., step S1036) with the suitability of the picking job array (i.e., a second array) stored as a solution.

In a case where the suitability of the first array is higher, the onlooker module may update and store the first array as a solution. In a case where the suitability of the first array is not higher, the onlooker module may increase the number of update attempts by one without updating the solution.

In the source re-search step S1040, the device 100 of the present disclosure may set the elements of the picking job array as random picking jobs when the number of update attempts exceeds the maximum number of update attempts. That is, the device 100 of the present disclosure may generate a plurality of picking job arrays whose elements are set as random picking jobs.

Figure 7:
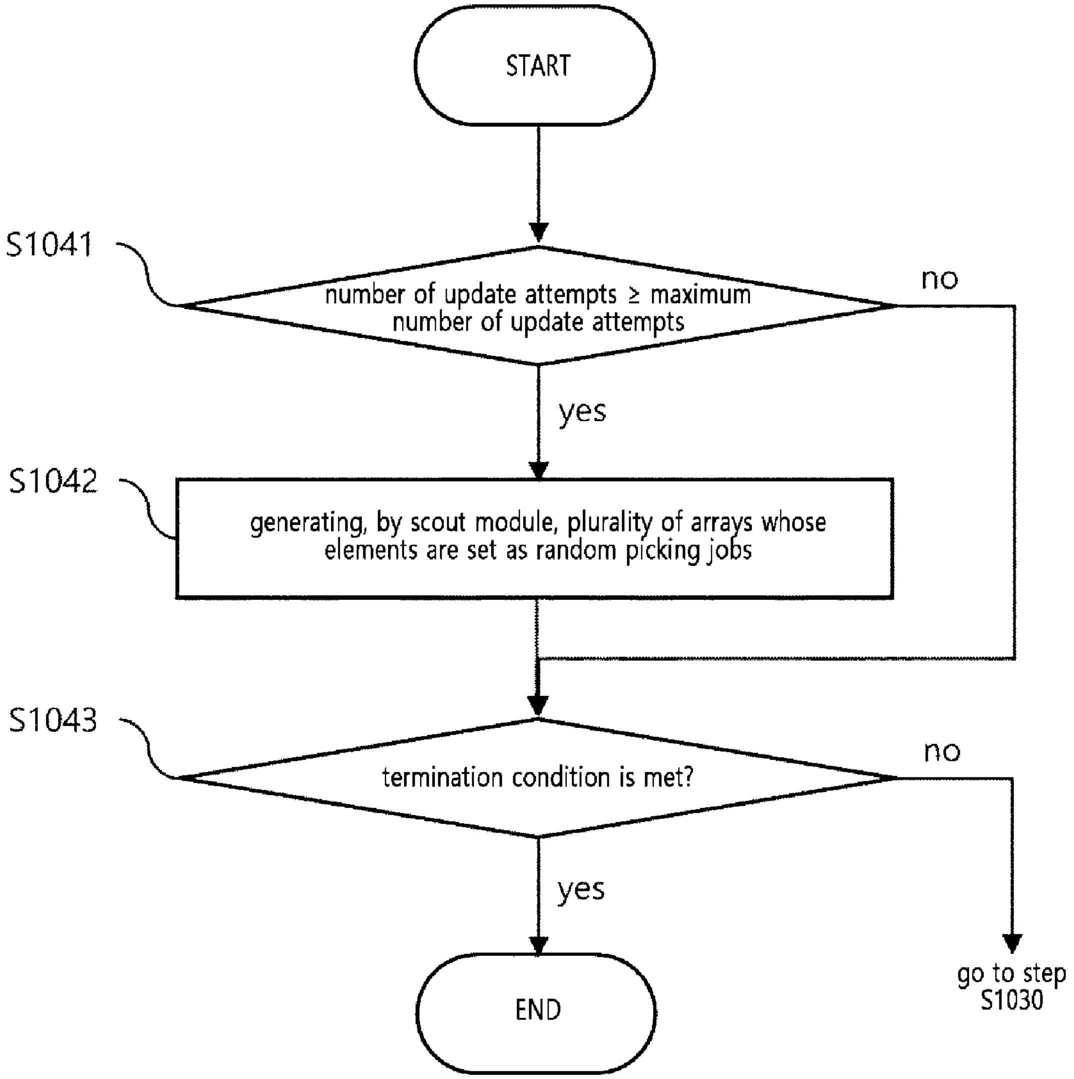
FIG. 7 is a flowchart briefly illustrating a method for re-searching for a solution in the exemplary embodiment of the present disclosure.

FIG. 7 is a flowchart briefly illustrating a method for re-searching for a solution in the exemplary embodiment of the present disclosure.

In step S1041, the onlooker module may compare the number of update attempts and the maximum number of update attempts with each other. When the number of update attempts exceeds the maximum number of update attempts, the onlooker module may instruct to re-search the source by generating the plurality of picking job arrays whose elements are set as the random picking jobs by the scout module.

In step S1042, the scout module may generate the plurality of picking job arrays whose elements are set as the random picking jobs in response to the instruction from the onlooker module. The plurality of picking job arrays generated may be different from the picking job array generated in the source initialization step S1020. Each of the plurality of picking job arrays so generated may become a new source.

In step S1043, when the number of update attempts is less than or equal to the maximum number of update attempts, the scout module may check a termination condition after re-searching the source. The termination condition may be, for example, whether the number of executions of the solution selection step S1030 exceeds the maximum number of executions of the solution selection step or not.

In a case where the termination condition is satisfied, the device 100 of the present disclosure may output the solution in storage as picking job information assigned to each order which is a resulting output. In a case where the termination condition is not satisfied, the device 100 of the present disclosure may re-execute the solution selection step S1030.

Figure 8:
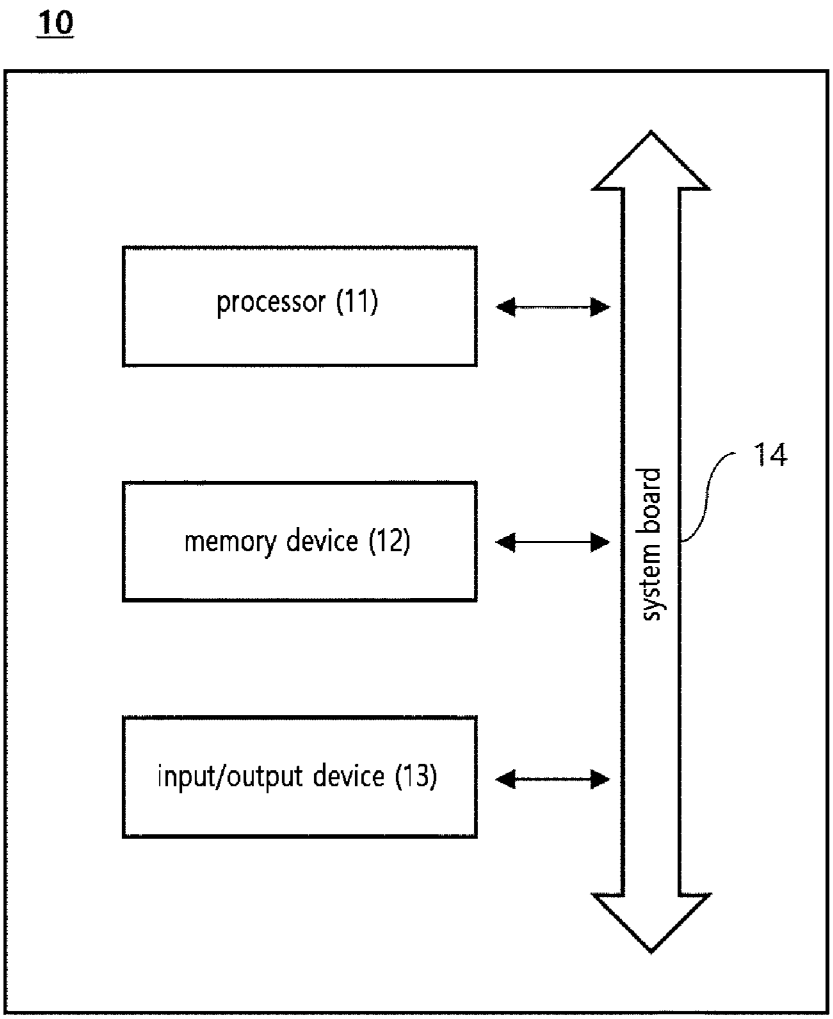
FIG. 8 is a view briefly illustrating a configuration of a computing device in the exemplary embodiment of the present disclosure.

FIG. 8 is a view briefly illustrating a configuration of a computing device in the exemplary embodiment of the present disclosure.

The computing device 10 includes a processor 11, a memory device 12, an input/output device 13, and a system board 14.

The processor 11 performs operations of reading, changing, or generating data used in the exemplary embodiments of the present disclosure. In addition, the processor 11 interprets and processes computer-readable instructions that execute the method for the exemplary embodiments of the present disclosure. The processor 11 may be a microprocessor including: a controller for interpreting instructions and generating control signals for execution; an arithmetic and logic unit for executing arithmetic and logical operation instructions; a register for storing a plurality of instructions, a position of a next instruction to be executed, and data to be input or output; a cache memory for temporarily storing data exchanged between the processor 11 and the memory device 12; and a system bus which is a passage through which data moves within the processor 11.

The memory device 12 stores data that is processed or input/output within the computing device 10. In addition, the memory device 12 stores computer-readable instructions for executing the method according to the exemplary embodiments of the present disclosure. The memory device 12 may include a main memory device and an auxiliary memory device. The main memory device may include a random access memory device or a flash memory device. The auxiliary storage device may include one or more of a hard disk drive, a solid state drive (SSD), a flash memory device, an optical disc drive, and a magnetic tape.

The input/output device 13 receives input of data into the computing device 10 and outputs the data to the outside. In addition, the input/output device 13 receives input of computer-readable instructions that execute the method according to the exemplary embodiments of the present disclosure. The input/output device may include an external input/output terminal and a driver device that processes the external input/output terminal. For example, the external input/output terminal may include a serial port, a parallel port, a small computer system interface (SCSI), a universal serial bus (USB), an IEEE 1394 port, an external serial advanced technology attachment (e-SATA), and a thunderbolt. In addition, the input/output device may include a network interface controller. The network interface controller may be connected to a local area network (LAN) based on Ethernet in a wired manner, or may be connected to a wireless local area network (WLAN) based on Wi-Fi in a wireless manner.

The system board 14 connects the processor 11, the memory device 12, and the input/output device 13 to each other, and provides a path for data processed by the computing device 10. The system board 14 may include an address bus, an instruction bus, a data bus, a chipset device that controls each bus, and a power system.

The system 100 may be connected to a terminal device located outside the system 100, a personal area network (PAN), a local area network (LAN), a metropolitan area network (MAN), and a wide area network (WAN), and may receive data from an external terminal device or transmit data to the external terminal device by using a data communication protocol such as a transmission control protocol/internet protocol (TCP/IP), a server message block (SMB), a common internet file system (CIFS), an network file system (NFS).

Although the exemplary embodiments of the present disclosure have been described above with reference to the accompanying drawings, it will be understood that those skilled in the art to which the present disclosure pertains may implement the present disclosure in other specific forms as well without departing from the technical spirit or essential features thereof. Therefore, the exemplary embodiments described above are to be understood in all respects as illustrative and not restrictive. The scope of protection of the present disclosure should be interpreted by the following claims, and all technical ideas within the scope equivalent thereto should be construed as being included in the scope of rights of the technical ideas defined by the present disclosure.

What is claimed is:

1. A method for organizing logistics picking jobs, the method comprising:

a source initialization step of generating a plurality of picking job arrays whose elements are set as random picking jobs, wherein each picking job array is a list of picking jobs that handle orders, wherein indices of the respective picking job arrays correspond to orders and the elements correspond to the picking jobs for handling the orders; and a solution selection step, via an employee module and an onlooker module of a device, of comparing suitabilities of the plurality of picking job arrays with each other and updating a picking job array having the highest suitability as a solution, wherein each suitability is a sum of distances traveled between locations in order to pick goods included in the orders, wherein location information about the goods to be picked for each picking job is obtained by referencing goods location data, wherein a sequencing of visiting the location of the goods is determined by referencing location ranking data, wherein the distances traveled when the locations of the goods are visited in the determined sequence is calculated by referencing distance matrix data, wherein the solution step comprises:

assigning a first array which is a picking job array to the employee module;

searching for, by the employee module, a second array adjacent to the first array, wherein the second array has one element of the first array exchanged with a second element;

calculating, by the employee module, suitability of the second array and transmitting one array having higher suitability from among the first array and the second array to the onlooker module;

probabilistically selecting one of a plurality of arrays received by the onlooker module from the employee module, including the first array or the second array having the higher suitability;

searching for a fourth array adjacent to a third array probabilistically selected by the onlooker module, calculating, by the onlooker module, suitability of the fourth array and selecting one array having a higher suitability from among the third array and the fourth array;

updating, by the onlooker module, the solution as the selected array when the suitability of the array selected by the onlooker module is higher than the suitability of a stored solution; and outputting, by the device, the solution as picking job information assigned to each order.

2. The method for claim 1, wherein indices of the respective picking job arrays correspond to orders, and the elements correspond to the picking jobs for handling the orders.

3. The method for claim 2, wherein the number of orders handled by each of a plurality of picking jobs is same as each other, or the number of orders handled by each picking job except for one picking job is same as each other.

4. The method for claim 1, wherein the searching for the second array adjacent to the first array or the searching for of the fourth array adjacent to the third array comprises:

a first step of randomly setting an exchange ratio;

a second step of searching for a second order whose goods list is same as or similar to that of a first order corresponding to an index selected in the first array or second array; and a third step of exchanging a picking job of the first order and a picking job of the second order, and the second step and third step are re-executed when a number of elements exchanged in the first array or second array is less than a value of (a total number of orders×the exchange ratio).

5. The method for claim 1, wherein the probabilistically selecting of one of the plurality of arrays received by the onlooker module executes any one of a roulette wheel selection method performs a Monte Carlo method, a ranking-based selection method, a stochastic universal sampling method, and a tournament selection method.

6. The method for claim 1 wherein the solution selection step increases the number of update attempts by one when the suitability of the array selected by the onlooker module is not higher than the suitability of the solution.

7. The method for claim 1, further comprising:

a source re-search step of generating the plurality of picking job arrays whose elements are set as the random picking jobs when the number of update attempts exceeds a maximum number of update attempts.

8. The method for claim 7, wherein the source re-search step transmits an instruction for the onlooker module to cause a scout module to generate the plurality of picking job arrays whose elements are set as the random picking jobs when the number of update attempts exceeds the maximum number of update attempts.

9. The method for claim 1, wherein, when the number of executions of the solution selection step exceeds a maximum number of executions of the solution selection step, the solution is output, and when not, the solution selection step is executed again.

* * * * *